(12) United States Patent
Knittig et al.

(10) Patent No.: US 10,188,239 B2
(45) Date of Patent: Jan. 29, 2019

(54) GRILLING TOOL

(71) Applicant: Holton Products LLC, Fort Smith, AR (US)

(72) Inventors: Colton Knittig, Fort Smith, AR (US); Israel Holby, Sharpsburg, GA (US)

(73) Assignee: Holton Products LLC, Fort Smith, AR (US)

( * ) Notice: Subject to any disclaimer, the term of this patent is extended or adjusted under 35 U.S.C. 154(b) by 222 days.

(21) Appl. No.: 14/870,868

(22) Filed: Sep. 30, 2015

(65) Prior Publication Data
US 2016/0360928 A1  Dec. 15, 2016

Related U.S. Application Data

(63) Continuation-in-part of application No. 29/530,132, filed on Jun. 12, 2015, now Pat. No. Des. 785,416.

(51) Int. Cl.
| | |
|---|---|
| *B25B 23/18* | (2006.01) |
| *A47J 43/28* | (2006.01) |
| *F21V 33/00* | (2006.01) |
| *F21V 21/088* | (2006.01) |
| *F21L 4/00* | (2006.01) |
| *F21V 23/04* | (2006.01) |

(52) U.S. Cl.
CPC ............ *A47J 43/283* (2013.01); *F21L 4/005* (2013.01); *F21V 21/088* (2013.01); *F21V 33/0036* (2013.01); *F21V 33/0084* (2013.01); *F21V 23/04* (2013.01)

(58) Field of Classification Search
CPC ....... A47J 43/283; F21L 4/005; F21V 21/088; F21V 23/04; F21V 33/0036; F21V 33/0084

USPC .......................................................... 362/119
See application file for complete search history.

(56) References Cited

U.S. PATENT DOCUMENTS

| | | | | |
|---|---|---|---|---|
| 2,864,645 | A | * | 12/1958 | Meldrum ............... A47G 21/10 294/106 |
| 5,023,761 | A | | 6/1991 | de Lange |
| 5,457,611 | A | * | 10/1995 | Verderber ............ A61B 1/2733 362/109 |
| 5,797,670 | A | * | 8/1998 | Snoke ..................... B25B 23/18 24/16 PB |

(Continued)

OTHER PUBLICATIONS http://www.amazon.com/DBTech-DB-BBDNB-Flashlight-Discontinued-Manufacturer/dp/B00FK1HYB2/ref=sr_1_1?ie=UTF8&qid=1429709339&sr=8-1&keywords=flashlight+tongs, accessed Jun. 1, 2015.

(Continued)

*Primary Examiner* — Tsion Tumebo

(57) ABSTRACT

A grilling tool may include tongs having arms and a hinge that pivotally connects proximal ends of the arms to each other. The arms may be configured to be moved between a closed position wherein distal ends of the arms are in close proximity, and an open position wherein the distal ends of the arms are spaced apart from each other. In addition, a flashlight may be mounted to an interior of the tongs. The flashlight may have an electrical switch that is configured to be accessed from an exterior of the tongs and actuated between on and off positions. The flashlight may include a body with a body axis, a head at a distal end of the body, and the head has a head axis that is not co-axial with the body axis. The distal ends of the arms may be located adjacent fringes of a light beam.

14 Claims, 6 Drawing Sheets

(56) References Cited

U.S. PATENT DOCUMENTS

| | | | |
|---|---|---|---|
| D401,371 S * | 11/1998 | Chen | D26/38 |
| 5,964,517 A | 10/1999 | Adams | |
| 6,092,847 A | 7/2000 | Kwan | |
| 6,161,937 A * | 12/2000 | Rosenstatter | A61C 1/088 362/109 |
| 6,675,483 B2 | 1/2004 | Bond et al. | |
| 6,862,764 B2 * | 3/2005 | Ping | B25F 1/04 7/125 |
| 6,988,814 B1 * | 1/2006 | Correa | A61B 17/30 362/109 |
| 7,008,077 B2 * | 3/2006 | Raichlen | A47J 37/0786 294/16 |
| 7,040,546 B2 * | 5/2006 | Horan | B05B 12/004 239/1 |
| 7,144,128 B2 * | 12/2006 | Brauner | A01K 97/00 362/119 |
| 7,232,235 B2 * | 6/2007 | Morrow | B25B 7/00 362/109 |
| 7,556,392 B2 * | 7/2009 | Weigl, Jr. | A47G 21/02 362/120 |
| 8,662,547 B2 * | 3/2014 | Jossem | A47G 21/10 294/16 |
| 9,254,065 B2 * | 2/2016 | Floyd | A47J 43/283 |
| 9,474,418 B1 * | 10/2016 | Liu | A47J 43/283 |
| 2006/0087842 A1 * | 4/2006 | Alessio | F21L 14/00 362/235 |
| 2008/0144309 A1 | 6/2008 | Nagata et al. | |
| 2009/0267372 A1 * | 10/2009 | Chen | B25B 9/02 294/99.2 |
| 2010/0052347 A1 | 3/2010 | Teng | |
| 2011/0140639 A1 * | 6/2011 | Shih | B25B 9/02 315/362 |

OTHER PUBLICATIONS http://www.amazon.com/Steven-Raichlen-Best-Barbecue-Grab-Light/dp/B0007ZGUH0/ref=sr_1_2?ie=UTF8&qid=1429709423&sr=8-2&keywords=flashlight+tongs, accessed Jun. 1, 2015.
http://www.amazon.com/Mudder-Stainless-Barbecue-Removable-Flashlight/dp/B00SSKPD42/ref=sr_1_6?ie=UTF8&qid=1429709475&sr=8-6&keywords=flashlight+tongs, accessed Jun. 1, 2015.
http://www.amazon.com/Tonglite-LX-X1000-Stainless-Barbecue-dishwasher/dp/B00K83CJOE/ref=sr_1_12?ie=UTF8&qid=1429709528&sr=8-12&keywords=flashlight+tongs, accessed Jun. 1, 2015.

* cited by examiner

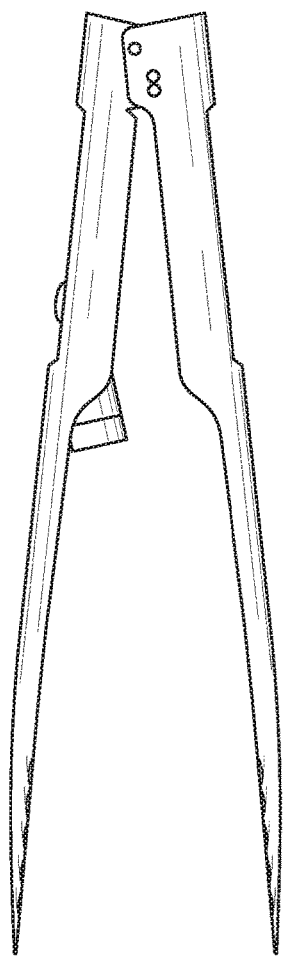
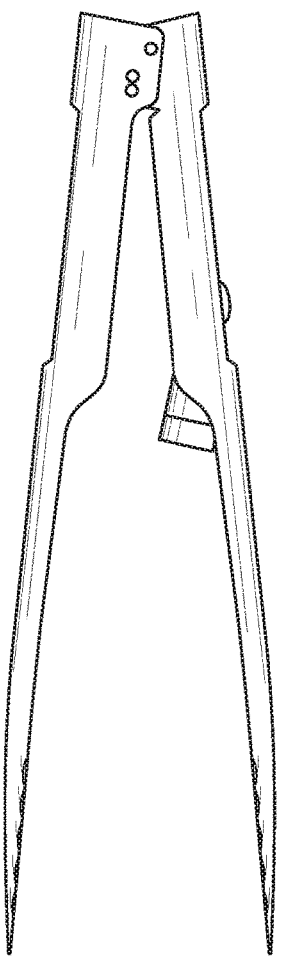
FIG. 6  FIG. 7  FIG. 8  FIG. 9
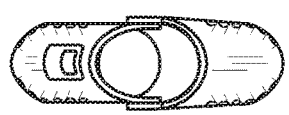
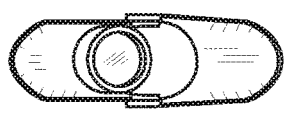
FIG. 10  FIG. 11

GRILLING TOOL

This application claims priority to and the benefit of U.S. application Ser. No. 29/530,132, filed Jun. 12, 2015, and is incorporated herein by reference in its entirety.

BACKGROUND OF THE INVENTION

Field of the Disclosure

The present invention relates in general to grilling food and, in particular, to a system, method and apparatus for grilling food with an illuminated tool.

Description of the Related Art

Cooking outdoors is a popular and growing trend. However, some cooks struggle with low light conditions, particularly when cooking in the evening. Prior art tools have been designed for outdoor cooking, but they typically comprise clip-on or magnetic lights that connect to the grill itself. Such prior art designs lack the ability to automatically aim a light beam directly to the place needed automatically. Thus, improvements in grilling tools continue to be of interest.

SUMMARY

Embodiments of a system, method and apparatus for grilling food with an illuminated tool are disclosed. For example, one version of a tool may include tongs having arms and a hinge that pivotally connects proximal ends of the arms to each other. The arms may be configured to be moved between a closed position wherein distal ends of the arms are in close proximity, and an open position wherein the distal ends of the arms are spaced apart from each other. In addition, a flashlight may be mounted to an interior of the tongs. The flashlight may have an electrical switch that is configured to be accessed from an exterior of the tongs and actuated between on and off positions.

In another embodiment of the tool, a flashlight may be mounted to tongs. The flashlight may include a body with a body axis, a head at a distal end of the body, and the head has a head axis that is not co-axial with the body axis.

In still another embodiment of the tool, a flashlight may be mounted to tongs and configured to emit a light beam toward the distal ends of the arms. When the arms are in a fully open position, the distal ends of the arms may be configured to be located adjacent fringes of the light beam.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIG. 4 is a side view of the grilling tool of FIGS. 1 and 2, shown in an open position, and with the flashlight installed and on.

FIG. 5-11 illustrate different views of an embodiment of a grilling tool, including isometric, top, bottom, side, and end views.

The use of the same reference symbols in different drawings indicates similar or identical items.

DETAILED DESCRIPTION

Figure 1:
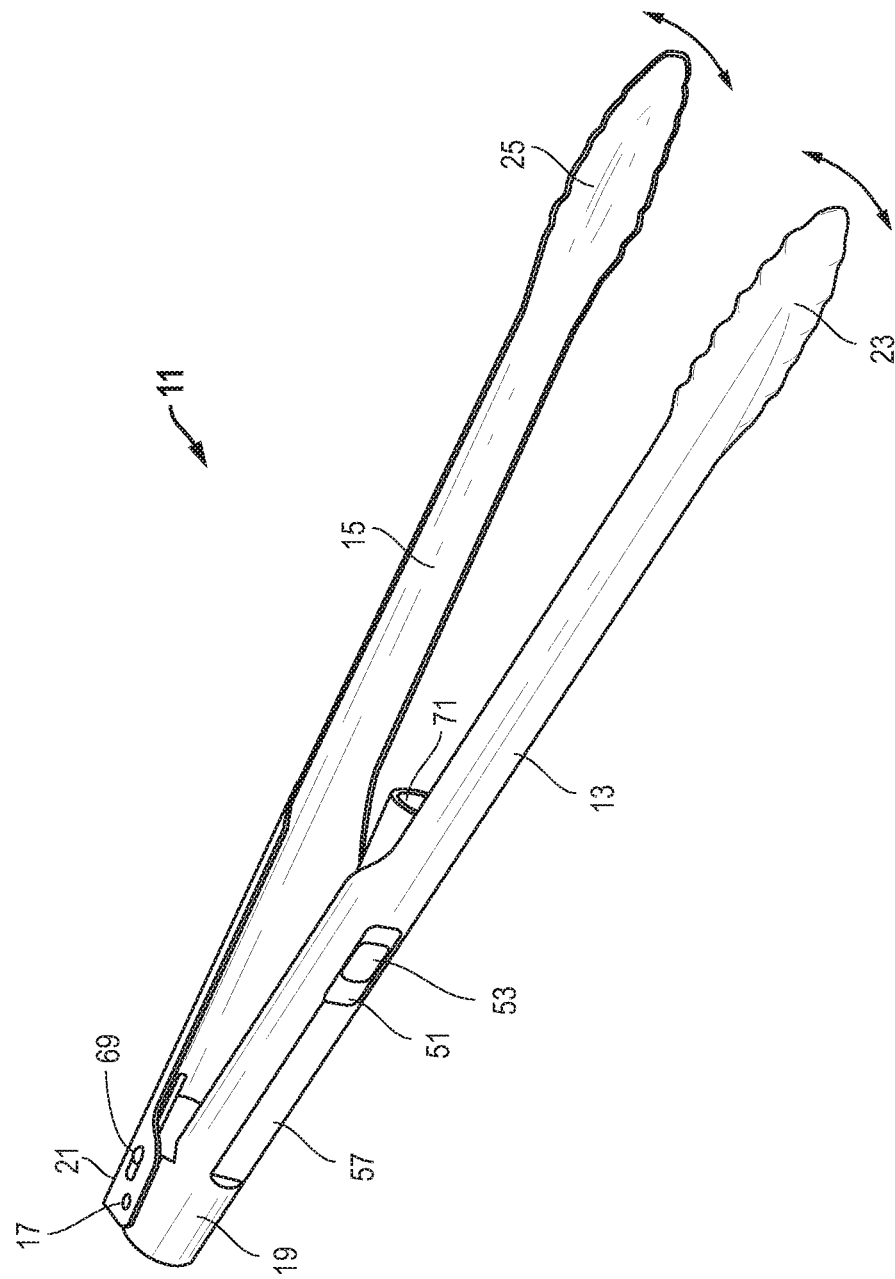
FIG. 1 is a top, front, isometric view of an embodiment of a grilling tool, shown in an open position.
Figure 2:
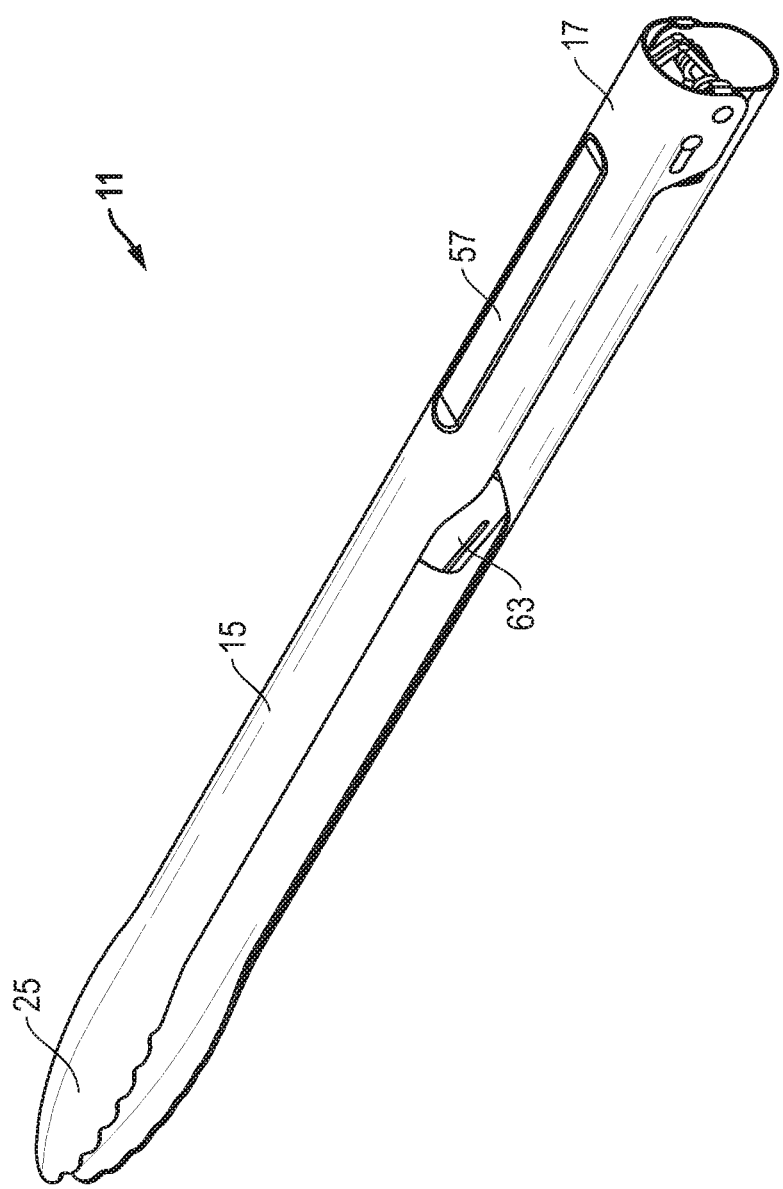
FIG. 2 is a bottom, rear, isometric view of the grilling tool of FIG. 1, shown in a closed position.
Figure 3:
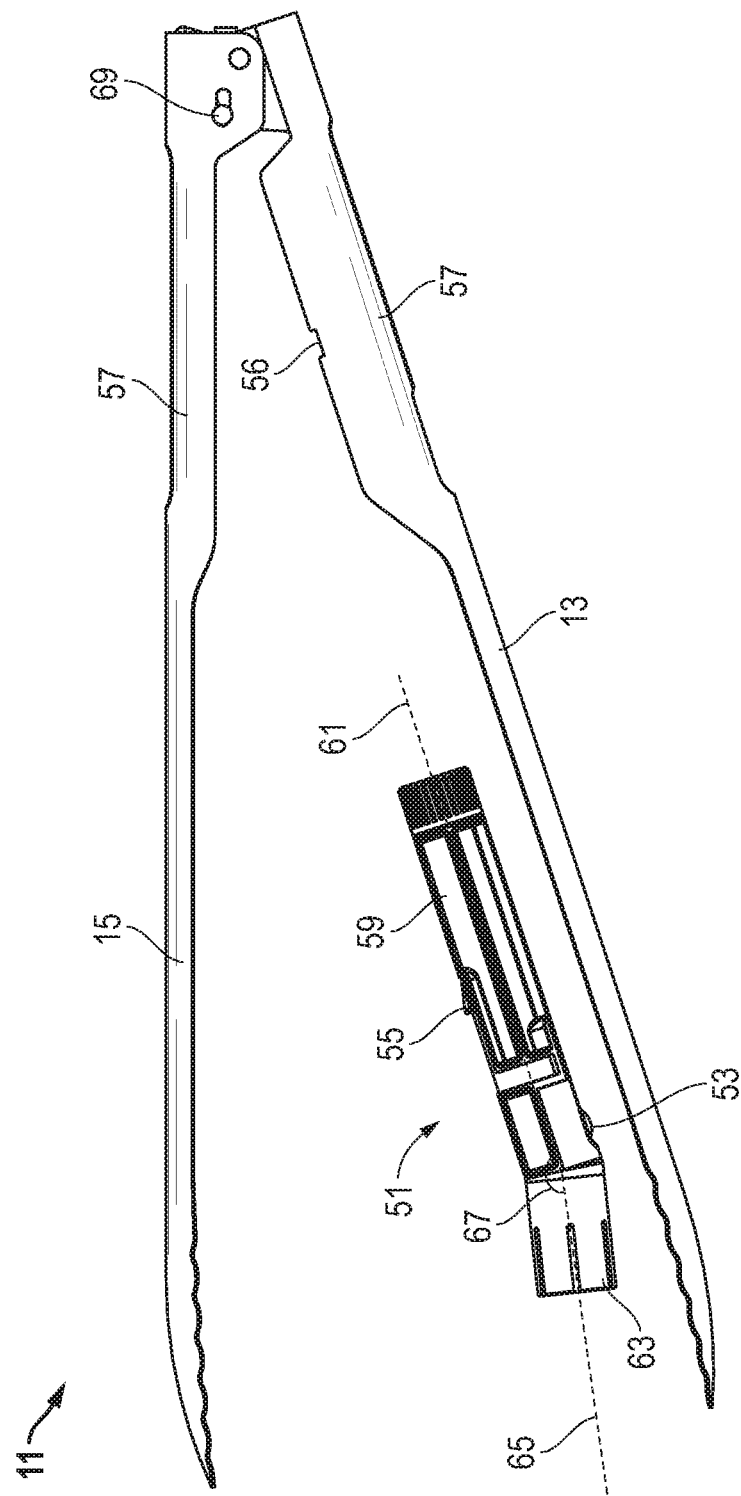
FIG. 3 is a side view of the grilling tool of FIGS. 1 and 2, shown in an open position, and with the flashlight removed.
Figure 4:
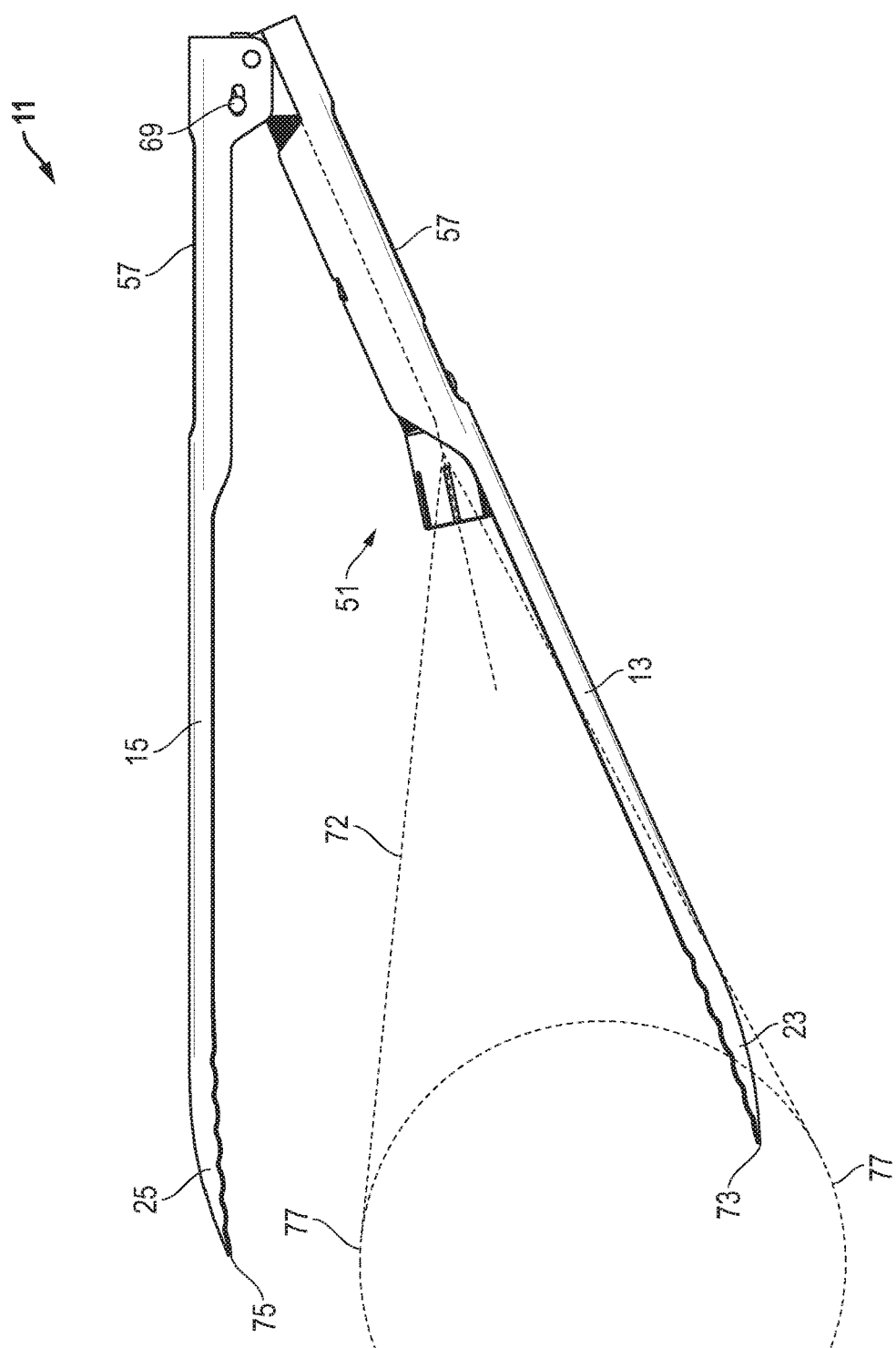
Figure 5:
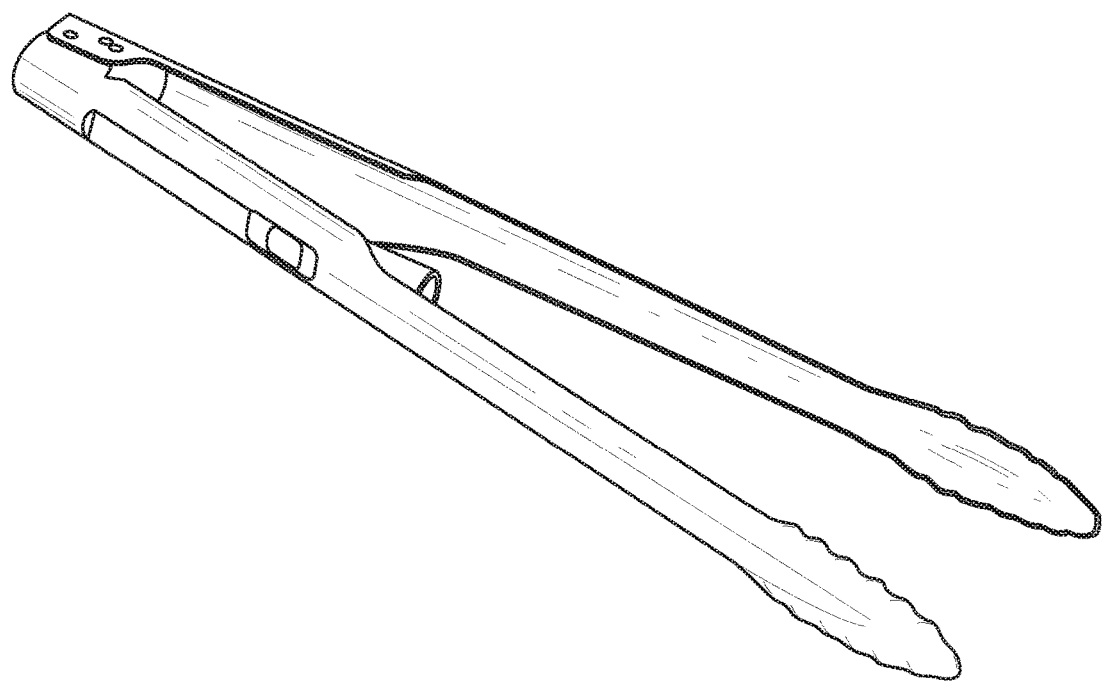

Embodiments of a system, method and apparatus for grilling food with an illuminated tool are disclosed. For example, as shown in FIGS. 1-4, an embodiment of a tool 11 may include tongs having arms 13, 15. Other embodiments of the tool 11 may include a spatula, a fork, brush, knife and the like. The tool 11 may be formed from stainless steel and other suitable materials. A hinge 17 may be used to pivotally connect proximal ends 19, 21 of the arms 13, 15 to each other. The arms 13, 15 may be configured to be moved between a closed position (FIG. 2) wherein the distal ends 23, 25 of the arms 13, 15 are in close proximity. In the closed position, tips 27, 29 of the distal ends 23, 25 may or may not touch, depending on the application. For example, the arms 13, 15 can be substantially parallel in the closed position.

In addition, the arms 13, 15 may include one or more open positions (FIGS. 1, 3 and 4) wherein the distal ends 23, 25 of the arms 13, 15 are spaced apart from each other, such as by a distance that is in excess of a distance therebetween in the closed position. For example, in some versions, a fully open position may include a distance between arms 13, 15 of about 6 inches to about 12 inches, depending on the application. When the arms 13, 15 are in the open position, the arms 13, 15 are configured to be at an angle with respect to the hinge 17. For example, the angle between the arms can be anywhere in a range of about 0 degrees to about 30 degrees. In one version, the arms 13, 15 can be spring-biased toward the open position. In the various open positions, the distal ends 23, 25 are configured to clamp food for cooking and/or serving.

Embodiments of the tool 11 may include a locked position (FIG. 2) wherein the arms 13, 15 are locked in the closed position, and an unlocked position (FIGS. 1, 3 and 4) wherein the arms 13, 15 are free to pivot about the hinge 17. In an example, the arms 13, 15 can be configured to be actuated between the locked and unlocked positions with a single hand of a user.

In another example, the tool 11 may be configured to be actuated between the locked and unlocked positions exclusively via gravity, without manual actuation by a user. In such embodiments, the tool 11 may be configured to automatically self-actuate and be put in the locked position by pointing the distal ends of the arms 13, 15 upward. Similarly, the tool 11 may be configured to automatically self-actuate and be put in the unlocked position by pointing the distal ends of the arms 13, 15 downward. These embodiments may be enabled, for example, by a pin 69 (FIG. 1) with rivets on end of the pin 69. The pin 69 may extend between slots in one of the arms (e.g., arm 15), and may be captured in the locked position by recesses in the other arm (e.g., arm 13). The pin 69 releases from the recesses in the unlocked position. In another example, the tool 11 locks closed by pointing it upwards in the closed position, causing the pin 69 to roll into the recesses, thereby locking the arms 13, 15 in the closed position. The tool 11 can be unlocked from the locked and closed positions by squeezing the arms 13, 15 of the tool 11 while pointing the tool 11 downward. This allows the pin 69 to fall out of the recesses, thereby releasing the arms 13, 15 to the open position.

In some embodiments, an optional flashlight 51 may be mounted to the tool 11. For example, the flashlight 51 may be mounted to an interior of the tool 11, as shown. In one version, the flashlight 51 is directly mounted to only one of the arms 13, 15. Embodiments of the flashlight 51 may include an electrical switch 53. The electrical switch 53 may be a manual switch, as is known in the art. Electrical switch 53 may be configured to be accessed from an exterior of the tool 11 and actuated between on and off positions. One version of the electrical switch 53 may be positioned and configured to be actuated by a thumb of a user when the tool 11 is held in one hand by the user. Versions of the electrical switch 53 may include such a low profile thumb button, as opposed to a button on a rear end of or side of the tool 11. This design may improve one-handed control of the tool 11 and flashlight 51. Some versions of a body of the flashlight 51 may be formed from plastic materials and may contain batteries, such as two AA batteries.

In some versions, the tool 11 may include a handle 57 on each of the arms 13, 15 between respective proximal ends 19, 21 and distal ends 23, 25 thereof. In the illustrated embodiment, the flashlight 51 may be located and mounted inside one of the handles 57. In some embodiments, one of the handles 57 is larger than the other (best shown in FIGS. 3 and 4), such that the tongs are not symmetric.

Embodiments of the tool 11 may include an installed position (FIGS. 1, 2 and 4) for the flashlight 51. In some versions, a spring clip 55 may be used to secure the flashlight 51 to the tool 11. The spring clip 55 may be mounted to the flashlight 51, such that it is captured by the tool 11 (e.g., in an aperture 56 in handle 57). Alternatively, the spring clip 55 may be mounted to the tool 11, such that it is captured by the flashlight 51. Embodiments of the tool 11 and flashlight 51 may further include a released position wherein the spring clip 55 is configured to be actuated (e.g., depressed) such that the flashlight 51 can be slidably removed (FIG. 3) from the tool 11. The flashlight 51 may be reattached to the tool 11 by sliding the flashlight 51 back into the handle 57 on arm 13 until spring clip 55 snaps into aperture 56. In addition, the tool 11 may be configured to be usable for cooking, such as outdoor grilling, and cleaning by a user with or without the flashlight.

Other embodiments of the flashlight 51 may include a body 59 (FIG. 3) with a body axis 61, and a head 63 having a head axis 65 at a distal end of the body 59. In some versions, the head axis 65 may not be co-axial with the body axis 61. For example, the head axis 65 can be off-axis from the body axis 61 by an angle 67. Versions of the angle 67 can be at least about 5 degrees, such as at least about 8 degrees, or even at least about 11 degrees. Other versions of the angle 67 can be not greater than about 20 degrees, such as not greater than about 17 degrees, or even not greater than about 14 degrees. Embodiments of the angle 67 can be in a range between any of these values.

Some embodiments of the tool 11 may include a version of the flashlight 51 having a lens 71 (FIG. 1) that is convex and a magnifying lens. When an embodiment of flashlight 51 is properly seated in tool 11, lens 71 may be configured to cast a conical beam of light 73 (FIG. 4) that substantially intersects and illuminates one or both tips 73, 75 of the distal ends 23, 25 of the arms 13, 15 when the arms 13, 15 are in the open position. Such designs minimize shadows cast by the tool 11 itself. In another embodiment, the flashlight 51 is mounted to the tool 11 and configured to emit a light beam 73 toward the distal ends 23, 25 of the arms 13, 15. In some versions, when the arms 13, 15 are in a fully open position, the distal ends 23, 25 of the arms 13, 15 may be configured to be located adjacent fringes 77 of the light beam 73. In one example, neither distal end 23, 25 is illuminated, such that the tool 11 itself does not cast a shadow onto the cook surface.

In some versions, the flashlight 51 is configured to emit light at selected Kelvin color temperatures. For example, the flashlight 51 may emit light at a color temperature of at least about 3250K. In other versions, the flashlight 51 may emit light at a color temperature of at least about 3300K, at least about 3400K, at least about 3500K, at least about 3600K, or even at least about 3700K. In other examples, the flashlight 51 may emit light at a color temperature of not greater than about 4250K. Still other versions of the flashlight 51 may emit light at a color temperature of not greater than about 4200K, such as not greater than about 4100K, not greater than about 4000K, not greater than about 3900K, or even not greater than about 3800K. Embodiments of the flashlight 51 may emit light at a color temperature in a range between any of these values. Such color temperatures enables the user to more accurately gauge the color of the food illuminated.

The tool described herein may be suitable for cooking food in low light environments, particularly outdoors in the evening when another light source is insufficient, not available or would be unappealing.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A tool, comprising:
    tongs having arms, a handle on each of the arms, and a hinge that pivotally connects the arms to each other, the arms are configured to be moved between a closed position wherein distal ends of the arms are in proximity to each other, an open position wherein the distal ends of the arms are spaced apart from each other, and one of the arms is larger than the other of the arms such that the tongs are not symmetric;
    a flashlight mounted to an interior of the tongs inside a cavity in one of the handles, the flashlight having an electrical switch that is configured to be accessed from an exterior of the tongs via an aperture in the one of the handles and actuated between on and off positions, the electrical switch is positioned and configured to be actuated by a thumb of a user when the tongs are held in one hand by the user, and the flashlight comprises a body with a body axis, a head at a distal end of the body, and the head comprises a head axis that is not co-axial with the body axis; and
    the tool comprises a spring clip opposite the electrical switch, the flashlight has an installed position wherein the flashlight is secured to the tool, the spring clip is releasably coupled to one of the flashlight or the one of the handles such that the spring clip is captured in an aperture of the flashlight or an aperture in an interior of the one of the handles, the flashlight also comprises a released position wherein the spring clip is configured to be actuated such that the flashlight is slidably removable from the tool.

2. The tool of claim 1, wherein the flashlight is configured to emit light at a Kelvin color temperature in a range of about 3500K to about 4000K.

3. The tool of claim 1, wherein the tongs have a locked position wherein the arms are locked in the closed position, and an unlocked position wherein the arms are free to pivot about the hinge.

4. The tool of claim 3, wherein the tongs are configured to be actuated between the locked and unlocked positions with a single hand of a user.

5. The tool of claim 3, wherein the tongs are configured to be actuated between the locked and unlocked positions via a pin that is responsively moved therebetween by gravity, without manual actuation by a user.

6. The tool of claim 5, wherein the tongs are configured to be put in the locked position by pointing the distal ends of the arms upward such that the pin slides to lock the arms from movement, and the tongs are configured to be put in the unlocked position by pointing the distal ends of the arms downward such that the pin slides to unlock the arms so that the arms can be pivotally actuated.

7. The tool of claim 1, wherein the head axis is off-axis from the body axis by an angle in a range of about 5 degrees to about 20 degrees.

8. The tool of claim 1, wherein, when the arms are in the open position, the arms are configured to be at an angle with respect to the hinge, and the angle is in a range of about 0 degrees to about 30 degrees.

9. The tool of claim 1, wherein the flashlight is releasably coupled to the tongs, such that the tongs are configured to be usable for cooking by a user with or without the flashlight.

10. The tool of claim 1, wherein the flashlight is configured to illuminate at least one tip of the distal ends of the arms in a fully open position.

11. The tool of claim 1, wherein the flashlight has a magnifying lens that is convex and configured to cast a conical beam of light that substantially intersects at least one tip of the distal ends of the arms when the arms are in the open position.

12. The tool of claim 1, wherein the arms are substantially parallel in the closed position, and the arms are spring-biased toward the open position.

13. A tool, comprising:
    tongs having arms, a handle on each of the arms, and a hinge that pivotally connects the arms to each other, and the arms are configured to be moved between a closed position wherein distal ends of the arms are in proximity, an open position wherein the distal ends of the arms are spaced apart from each other, and one of the arms is larger than the other of the arms such that the tongs are not symmetric;
    the tool is configured to be actuated between locked and unlocked positions exclusively via gravity with a single hand of a user, the tool is configured to actuate and be put in the locked position by pointing the distal ends of the arms upward, the tool is configured to actuate and be put in the unlocked position by pointing the distal ends of the arms downward, wherein a pin extends between slots in one of the arms and is captured in the locked position by recesses in the other arm, the pin releases from the recesses in the unlocked position, the tool locks in the closed position by pointing the tool upward, thereby causing the pin to move in a linear, proximal direction into the recesses to lock the arms in the closed position, the tool is unlocked from the locked and closed positions by squeezing the arms of the tool while pointing the tool downward to allow the pin to move in a linear, distal direction out of the recesses, thereby releasing the arms to the open position;
    a flashlight mounted to an interior of the tongs inside a cavity of one of the handles and configured to emit a light beam toward the distal ends of the arms, the flashlight is configured to emit light at a Kelvin color temperature in a range of about 3250K to about 4250K, wherein, when the arms are in a fully open position, the distal ends of the arms are configured to be located adjacent fringes of the light beam, the flashlight comprises a body with a body axis, a head at a distal end of the body, the head comprises a head axis that is not co-axial with the body axis, the head axis is off-axis from the body axis by an angle in a range of about 5 degrees to about 20 degrees, and the flashlight has a magnifying lens that is convex and configured to cast a conical beam of light that substantially intersects at least one tip of the distal ends of the arms when the arms are in the open position;

the flashlight comprises an electrical switch that is configured to be accessed from an exterior of the one of the handles via an aperture in the one of the handles and actuated between on and off positions, and the electrical switch is positioned and configured to be actuated by a thumb of the user when the tongs are held in one hand by the user; and the flashlight comprises an installed position wherein a spring clip that is opposite to the electrical switch secures the flashlight to the one of the handles, the spring clip is releasably mounted to the one of the handles, such that the spring clip is captured in an aperture in an interior of the one of the handles, the flashlight also comprises a released position wherein the spring clip is configured to be actuated such that the flashlight is slidably removable from the one of the handles.

14. A tool, comprising:

a tool body comprising one of a fork, brush, knife or tongs, the tool body having a handle with an interior cavity;

a flashlight mounted in the interior cavity of the handle of the tool body, the flashlight having an electrical switch that is configured to be actuated between on and off positions, the electrical switch is configured to be accessed from an exterior of the handle via an aperture in the handle and actuated between on and off positions from the exterior of the tool body, the electrical switch is positioned and configured to be actuated by a thumb of a user when the tool body is held in one hand by the user, the flashlight has an installed position securing the flashlight to the tool body, and a released position such that the flashlight can be removed from the tool body, and the flashlight is releasably coupled to the tool body, such that the tool body is configured to be usable for cooking by the user with or without the flashlight;

the flashlight comprises a spring clip opposite to the electrical switch, the flashlight having an installed position that secures the flashlight to the handle, wherein the spring clip is releasably coupled to the handle and captured in an aperture in an interior of the handle, and the flashlight also comprises a released position wherein the spring clip is configured to be actuated such that the flashlight is slidably removable from the handle; and the flashlight has a magnifying lens that is convex and configured to cast a conical beam of light that substantially intersects a distal portion of the tool body, and the flashlight is configured to:

emit a light beam toward a distal end of the tool body, and the distal end of the tool body is configured to be located adjacent a fringe of the light beam; and emit light at a Kelvin color temperature in a range of about 3250K to about 4250K.

\* \* \* \* \*